United States Patent
Wells et al.

[15] 3,678,731
[45] July 25, 1972

[54] APPARATUS FOR MEASURING THE FLOW VELOCITY OF FLUIDS

[72] Inventors: Frank Herbert Wells, Abingdon, England; Cyril Norman Davey, deceased, late of Newbury, England by Catherine Margaret Davey, administratix

[73] Assignee: United Kingdom Atomic Energy Authority, London, England

[22] Filed: Sept. 29, 1967

[21] Appl. No.: 870,377

[30] Foreign Application Priority Data

Oct. 4, 1968  Great Britain.....................47,310/68

[52] U.S. Cl. .........................................................73/194 A
[51] Int. Cl. .................................................G01p 5/00
[58] Field of Search................................73/194 A, 181, 189

[56] References Cited

UNITED STATES PATENTS

| | | |
|---|---|---|
| 2,669,121 | 2/1954 | Garman et al. .....................73/194 A |
| 2,708,366 | 5/1955 | Blocher et al. .....................73/194 A X |
| 3,171,095 | 2/1965 | Gennari .........................73/194 A X |
| 2,911,825 | 11/1959 | Kritz.....................................73/194 A |
| 2,993,373 | 7/1961 | Kritz.....................................73/194 A |
| 3,204,456 | 9/1965 | Welkowitz..........................73/194 A |
| 3,237,453 | 3/1966 | Yamamoto et al...................73/194 A |
| 3,473,378 | 10/1969 | Yoshiyama et al..................73/194 A |

FOREIGN PATENTS OR APPLICATIONS

146,517  8/1962  U.S.S.R.................................73/194 A

Primary Examiner—Charles A. Ruehl
Attorney—Larson, Taylor & Hinds

[57] ABSTRACT

The apparatus comprises two ultrasonic transducers spaced apart and arranged in the line of flow to be measured. The transducers are connected to act as both transmitters and receivers. The time of travel of a pulse of ultrasound in the direction of flow is compared with the time of travel of a pulse of ultrasound in the reverse direction. The fluid paths traversed are thus identical, but the pulses are slightly separated in time.

6 Claims, 3 Drawing Figures

Patented July 25, 1972

3,678,731

APPARATUS FOR MEASURING THE FLOW VELOCITY OF FLUIDS

BACKGROUND OF THE INVENTION

The invention relates to apparatus for measuring the flow velocity of fluids.

Fluid flow velocity may be deduced from measurements of the time taken for pressure waves in the fluid to traverse a predetermined path respectively in the direction of flow and opposite to the direction of flow. The measurements may be carried out with two pairs of transducers, each pair comprising a transmitter and a receiver of, for example, ultrasonic pressure wave pulses. The transducers are arranged so that the ultrasonic pulses travel in opposite directions along parallel equal length paths positioned as close together as possible.

A disadvantage of this technique is that small differences between the two transmission paths, such as differences in temperature of the fluid, can cause serious errors in the measurement of the fluid velocity.

SUMMARY OF THE INVENTION

The invention provides apparatus for measuring a flow velocity or velocity component of a fluid, which apparatus comprises first and second units arranged spaced apart to define a single path extending through the fluid in the direction in which flow velocity or flow velocity component is to be measured, each of which units comprises a single transducer capable of operating as a transmitter and as a receiver of pressure wave pulses, first pulse generator means operative, when triggered, to cause the first unit to transmit a pressure wave pulse, second pulse generator means operative, when triggered, to cause the second unit to transmit a pressure wave pulse, means for re-triggering the first pulse generator means upon reception of a pressure wave pulse by the second unit, means for re-triggering the second pulse generator means upon reception of a pressure wave pulse by the first unit, means inhibiting the re-triggering except during a predetermined period embracing the expected reception of a pulse, means for introducing, when necessary, delay in the retriggering of the pulse generator means to avoid simultaneous transmission and reception of a pulse by either of the units, whereby in operation the first and second units each transmit and receive continuously trains of pressure wave pulses travelling over the same path in the fluid but in opposite directions without clash at either unit between the moment of reception of an individual pulse at a unit and the moment of transmission of a pulse from that unit, and means for indicating the difference in frequency of pulse repetition of the first unit from the second.

Preferably the transducers are ultrasonic electromechanical transducers.

Preferably a first coincidence detector is arranged to provide an output signal when the second unit transmits a pulse within a predetermined short period after the first unit transmits a pulse. Preferably control means responsive to an output signal from the first coincidence detector operates to delay the next pulse transmission of the first unit such that this occurs well after the next successive pulse transmission of the second unit. In this way the number of output signals per unit time from the first coincidence detector is proportional to fluid flow velocity when this is in the direction from the second unit towards the first.

Preferably a second coincidence detector is arranged to provide an output signal when the first unit transmits a pulse within a predetermined short period after the second unit transmits a pulse and preferably further control means responsive to an output signal from the second coincidence detector operates to delay the next pulse transmission of the second unit such that this occurs well after the next successive pulse transmission of the first unit. In this way the number of output signals per unit time from the second coincidence detector is proportional to fluid flow velocity when this is in the direction from the first unit towards the second.

BRIEF DESCRIPTION OF THE DRAWINGS

A specific construction of apparatus embodying the invention will now be described by way of example and with reference to the accompanying drawings in which.

DESCRIPTION OF PREFERRED EMBODIMENT

In this example, the apparatus is set up for measuring the flow velocity of the liquid 11 through a pipe 12.

Figure 1:
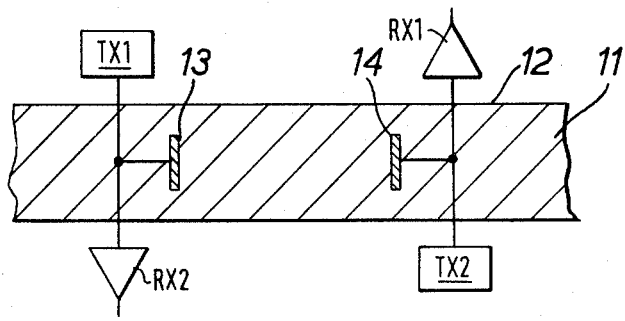
FIG. 1 is a diagrammatic side sectional view of part of the apparatus.

Transducers 13 and 14 are arranged spaced apart along the length of the pipe 12. The transducer 13 forms part of a combined transmitter and receiver of ultrasonic pressure wave pulses. The transducer 14 forms part of a second combined transmitter and receiver similar to the first unit. FIG. 1 illustrates the essential components of these units. The first unit has transmitter TX 1 and receiver RX 2 and the second unit has transmitter TX 2 and receiver RX 1.

Figure 2:
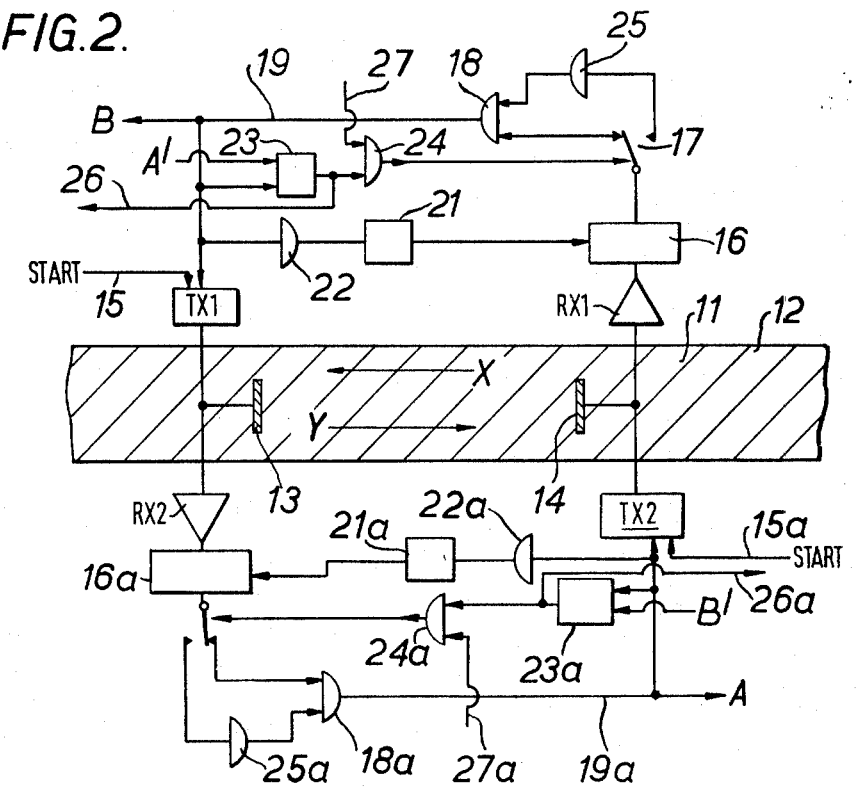
FIG. 2 is a diagrammatic side sectional view similar to FIG. 1 but showing more of the electronic apparatus.

Referring to FIG. 2, a start signal on line 15 triggers the transmitter TX 1 and an ultrasonic pulse is emitted from transducer 13. This pulse is received by transducer 14 detected and amplified by receiver RX 1 and applied to a "Zero cross-over" timing discriminator 16. The output signal from the discriminator 16 is passed via an electronic switch 17 and an OR gate 18 to line 19. This line 19 is connected to transmitter TX 1 so as to re-trigger the transmitter TX 1. In this way a succession of pulses is generated at transducer 13 and received at transducer 14 and the pulse repetition rate is inversely proportional to the time of travel of the pulses between the transducers 13 and 14.

A succession of pulses travelling from transducer 14 to transducer 13 is similarly generated by transmitter TX 2 started by a signal on line 15a. The components which operate in an exactly comparable way with those described for the circuit of transmitter TX 1 are referenced with the same reference numerals distinguished by the suffix a.

In order that the transmission pulses from transmitter TX 2 should not generate a re-triggering pulse for transmitter TX 1 and also to avoid or reduce the possibility of spurious generation of re-triggering signals, the discriminator 16 is controlled so that it is operative only for a period encompassing the expected time of arrival of a received pulse at the transducer 14. This control is effected by "strobe" gate 21, the signal for which is derived via delay 22 from the re-triggering signal on line 19.

Similar provision for the discriminator 16a is made with strobe gate 21a and delay 22a.

The points A, A¹ and B, B¹ respectively are connected together. A coincidence gate 23 detects when the pulse of transmitter TX 2 occurs within a predetermined short time interval after the pulse from the transmitter TX 1. An output from the gate 23 operates the electronic switch 17 via OR gate 24 and introduces a delay 25 into the next re-triggering pulse from the discriminator 16. The delay is sufficient for the next pulse from transmitter TX 1 to be well after the next pulse from transmitter TX 2. This action avoids the two transmitters being triggered too close together in time and so causing receiver paralysis during the time needed for reception.

The number of times per second that the coincidence gate 23 detects the close proximity in time of pulse transmissions from the two transmitters TX 1 and TX 2 gives a measure of the difference in transmission times and is directly proportional to the liquid velocity. This may be expressed mathematically as follows:

let $v$ = velocity of liquid in direction of the transmission path
$c$ = velocity of sound in liquid
$L$ = distance apart of transducers
$f1$ = repetition rate of transmitter TX 1
$f2$ = repetition rate of transmitter TX 2

Then
$$f1 = (c+v)/L$$
$$f2 = (c-v)/L$$
$$f1 - f2 = 2v/L$$
$$f1 + f2 = 2c/L$$

The term $(f1 - f2)$ is measured by counting the number of outputs from coincidence gate 23 in a given time interval. These outputs are provided on line 26.

As the coincidence gate 23 detects when the transmissions from transmitter TX 2 are within a short time interval after the transmissions from transmitter TX 1, outputs on line 26 are obtained only when the liquid is flowing in the direction of the arrow X.

Figure 3:
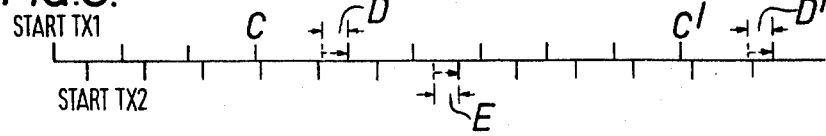
FIG. 3 is a diagrammatic representation of pulse successions for illustrating the operation of the apparatus.

This may be appreciated from Fig. 3 in which the axis represents time and the vertical lines above the axis represent pulses of transmitter TX 1 and the vertical lines below the axis represent pulses of transmitter TX 2. As the liquid is flowing in the direction X, the time between the pulses of transmitter TX 2 is slightly shorter than that between the pulses of transmitter TX 1. At C, the coincidence gate 23 is triggered and the next pulse of transmitter TX 1 (shown dotted in the position in which it would have occurred) is delayed by D. To avoid the introduction of this delay D from upsetting the $(f1-f2)$ reading on line 26, an equal compensating delay is introduced into the pulse succession from the transmitter TX 2. This is indicated at E and occurs a sufficient time later for the pulses from the two transmitters to be well separated in time. The signal for introducing this compensating delay is applied on line 27a to OR gate 24a. The source of this compensating delay signal is not shown but may, for example, be derived from another coincidence gate which detects when the pulse from transmitter TX 2 occurs approximately midway in time between successive pulses from transmitter TX 2. The next triggering of gate 23 and consequent delay in the pulse transmissions from transmitter TX 1 is shown in FIG. 3 at $c^1$ and $D^1$.

It will be apparent from the symmetry of the arrangement that, when the liquid flow is in the direction of arrow Y, the output pulses from which $(f1-f2)$ may be derived will be provided from coincidence gate 23a on line 26a. It will be appreciated that the coincidence gate 23a detects when the pulse from transmitter TX 1 occurs within a given short time interval after the pulse from transmitter TX 2. The situation is thus the reverse of that shown in FIG. 3. The initial delay is applied to transmitter TX 2 and the subsequent compensating delay, produced via line 27, is applied to transmitter TX 1.

The invention is not restricted to the details of the foregoing example. For instance, in addition to measuring the flow velocity of a fluid through a pipeline, the apparatus may be employed for measuring any relative movement between a fluid and the apparatus in the line of the two transducers 13, 14. For example, the apparatus may be employed for measuring the speed of a ship through water by arranging the transducers 13, 14 to project into the water on a line parallel with the fore-aft axis of the ship.

We claim:

1. Apparatus for measuring a flow velocity or velocity component of a fluid, which apparatus comprises first and second units arranged spaced apart to define a single path extending through the fluid in the direction in which flow velocity or flow velocity component is to be measured, each of which units comprises a single transducer capable of operating as a transmitter and as a receiver of pressure wave pulses, first pulse generator means operative, when triggered, to cause the said first unit to transmit a pressure wave pulse, second pulse generator means operative, when triggered, to cause the said second unit to transmit a pressure wave pulse, means for retriggering the said first pulse generator means upon reception of a pressure wave pulse by the second unit, means for retriggering the said second pulse generator means upon reception of a pressure wave pulse by the first unit, means inhibiting said re-triggering except during a predetermined period embracing the expected reception of a pulse, means for introducing, when necessary, delay in the re-triggering of the pulse generator means to avoid simultaneous transmission and reception of a pulse by either of said units, whereby in operation the first and second units each transmit and receive continuously trains of pressure wave pulses travelling over the same path in the fluid but in opposite directions without clash at either unit between the moment of reception of an individual pulse at a said unit and the moment of transmission of a pulse from that unit, and means for indicating the difference in frequency of pulse repetition of the first unit from the second.

2. Apparatus as claimed in claim 1 wherein said transducers are ultrasonic electromechanical transducers.

3. Apparatus as claimed in claim 1, wherein said delay introducing means includes a first coincidence detector arranged to provide an output signal when the second unit transmits a pulse within a predetermined short period after the first unit transmits a pulse.

4. Apparatus as claimed in claim 3, wherein said delay introducing means includes control means responsive to an output signal from the first coincidence detector to delay the next pulse transmission of the first unit such that this occurs well after the next successive pulse transmission of the second unit.

5. Apparatus as claimed in claim 4, wherein said delay introducing means includes a second coincidence detector arranged to provide an output signal when the first unit transmits a pulse within a predetermined short period after the second unit transmits a pulse.

6. Apparatus as claimed in claim 5, wherein said delay introducing means includes further control means responsive to an output signal from the second coincidence detector to delay the next pulse transmission of the second unit such that this occurs well after the next successive pulse transmission of the first unit.

* * * * *